(12) United States Patent
Bezreh

(10) Patent No.: US 6,495,192 B2
(45) Date of Patent: Dec. 17, 2002

(54) ANIMAL FEED

(76) Inventor: Ellice Bezreh, 12 Ames Dr., Sherborn, MA (US) 01770

(*) Notice: Subject to any disclaimer, the term of this patent is extended or adjusted under 35 U.S.C. 154(b) by 0 days.

(21) Appl. No.: 09/962,999

(22) Filed: Sep. 25, 2001

(65) Prior Publication Data

US 2002/0064589 A1 May 30, 2002

Related U.S. Application Data

(60) Provisional application No. 60/235,070, filed on Sep. 25, 2000.

(51) Int. Cl.⁷ .............................. A23K 1/14; A23K 1/18
(52) U.S. Cl. ..................... 426/635; 426/655; 426/661
(58) Field of Search ................................ 426/635, 655, 426/661

(56) References Cited

U.S. PATENT DOCUMENTS

| | | | | |
|---|---|---|---|---|
| 3,278,309 A | * | 10/1966 | Heap et al. ...................... 99/6 |
| 4,197,320 A | * | 4/1980 | Betz et al. ...................... 426/2 |
| 4,391,831 A | * | 7/1983 | Knobloch ...................... 426/309 |
| 5,069,903 A | * | 12/1991 | Stitt ........................ 424/195.1 |
| 6,133,318 A | * | 10/2000 | Hart ........................... 514/574 |

FOREIGN PATENT DOCUMENTS

| | | | |
|---|---|---|---|
| CA | 823609 | * | 11/1965 |
| FR | 2140855 | * | 1/1973 |
| FR | 2726974 | * | 5/1996 |
| JP | 02109946 | * | 4/1990 |
| JP | 08038070 | * | 2/1996 |

OTHER PUBLICATIONS

"Nutra–Flax" from www.horsetech.com/nutra–flax.htm, 2000.*

"Feed" from www.je–ideadesign.com/HA/feed.htm, 2000.*

* cited by examiner

Primary Examiner—Chhaya D. Sayala
(74) Attorney, Agent, or Firm—Wolf, Greenfield & Sacks, P.C.

(57) ABSTRACT

A horse feed made from carrot juice derived from a carrot prior to consumption. The invention further includes the combination of carrot pulp to form a complete juiced carrot for consumption by a horse either as part of or as a complete feed.

13 Claims, No Drawings

ANIMAL FEED

CROSS-REFERENCE TO RELATED APPLICATIONS

This application claims the benefit of U.S. Provisional Patent Application No. 60/235,070, filed Sep. 25, 2000.

This invention relates to an animal feed, and more particularly, a horse feed.

BACKGROUND

As animals of all species grow older, their bodies require different substances to maintain longevity and well being, both physical and mental. In particular for horses, the choices for feed are substantially varied. It is important that any horse feed formula includes a sufficient nutritional foundation to maintain or even improve the health and comfort of the animal as it ages and naturally becomes more susceptible to illnesses and other associated problems.

Currently available in the marketplace are several different feeds. These feeds often include artificial ingredients or chemically treated natural foods. Other feeds include fillers, preservatives, and added sugars or sugar equivalents.

In addition, the ability of the animal to digest feed changes over time. As such, maximizing the nutritional intake by the animal becomes important in order to maintain the animal's quality of life.

SUMMARY OF THE INVENTION

The present invention provides a horse feed made from carrot juice derived from a carrot prior to consumption. The invention further includes the combination of carrot pulp to form a complete juiced carrot for consumption by a horse either as part of or as a complete feed.

DETAILED DESCRIPTION

The subject invention focuses on the use of a juiced carrot alone or as part of an animal feed, particularly for horses. The invention also includes combining a juiced carrot in combination with other foods to create a whole food product that uses non-refined products as a feed. The feed has no additives, no fillers, no preservatives, no artificial ingredients, no yeast, and no added sugars.

A juiced carrot is the combination of the juice extracted from a carrot and the remaining carrot pulp. The green stem of the carrot may be included during the juicing process for added nutritional value. Roughly a carrot produces a volumetric ratio of 3:1, pulp to juice. For example, five pounds of carrots yields 4.5 cups of carrot juice and 2.5 pounds of pulp. The carrot juice and pulp are mixed together to form the juiced carrot described herein. The juiced carrot may be combined with several other all-natural, preferably organic, ingredients as more fully described below to form a healthy feed, or even as part of a diet including hay, grass, or other roughage. The advantage of juiced carrots is that it allows the nutrients from the juice to enter the digestive system more effectively and with greater ease and less demand on the horse's system. The juice portion allows the nutrients to enter the blood stream more quickly, thus allowing a more prompt delivery of nutrition into the horse's system. This is of particular value and of life-saving value to horses with poor teeth and chewing problems, horses that have been hospitalized, and for horses that are in a pre- or post-surgery condition.

Grated carrots, although not as effective, do provide the nutritional benefit of a raw food. The subject invention, as described herein, should be fed to the animal after proper examination of the specific horse.

Studies have shown the juiced carrot to have superior qualities and impact on the physical integrity of a horse. Moreover, an "unjuiced" carrot may not be as easy for a horse to chew due to age related problems or other physical problems, therefore not allowing all horses to derive the same nutritional benefits as from the juiced carrot.

The subject invention includes general recipes that are based on the age of the horse. The particular horse, due to needs for that horse, including caloric intake and more nutrients, may require variation to the recipe. The age references herein relate to current research on elder equines. As described above, grated carrots may be suitable for animals with better teeth and a better functioning digestive system. Thus, the recipe plans described herein can have grated carrots substituted for juiced carrots depending on the horse. Equivalents to the program will be generally understood by one of ordinary skill in the art.

The recipes are described in general terms applicable for horses of the ages enumerated below based on the general sizes and health for horses in those age groups. The following are the recipes by age category based on three feedings per day:

| RECIPE I | RECIPE II | RECIPE III |
|---|---|---|
| | Age: | |
| 15–24 | 24–29 | 29–44 |
| | Ingredients: | |
| 1½ pounds juiced carrots | 3 pounds juiced carrots | 7½ pounds juiced carrots |
| ½–1 cup cooked corn niblets | ½–1 cup cooked corn niblets | ½–1 cup cooked corn niblets |
| ½–1 cup cooked oatmeal | ½–1½ cups cooked oatmeal | 1½–2½ cups cooked oatmeal |
| ¼–½ cup cooked soybeans | ½–1 cup cooked soybeans | 1–2 cups cooked soybeans |
| 1½ tablespoons ground flaxseed | 1½ tablespoons ground flaxseed | 1½ tablespoons ground flaxseed |
| 4 ounces unleavened sprouted wheat-bread | 4–7 ounces unleavened sprouted wheat-bread | 7–14 ounces unleavened sprouted wheat-bread |
| 1½–2½ cups hot water | 2½–3½ cups hot water | 6–7 cups hot water |

Recipe I. For horses that are between the ages of 15 and 24, it is suggested that 5 to 10 pounds of juiced carrots be consumed per day. For the recipe as shown above, a 5-pound recipe is used, but the amount of juiced carrots may be increased. The remaining juiced carrots should be given either as a snack or equally divided among the three meals.

Recipe II. For a horse in the age category of 24 to 29, the above recipe including juiced carrots of 10 to 20 lbs. per day is recommended. For the recipe as shown above, a 10-pound recipe is used, but the amount of juiced carrots may be increased. The remaining juiced carrots should be given either as a snack or equally divided among the three meals.

Recipe III. For a horse in the age category of 29 to 44, a recipe including juiced carrots of 20 to 30 lbs. per day is recommended. For the recipe as shown above, a 30-pound recipe is used, but the amount of juiced carrots may be decreased. The remaining juiced carrots should be given either as a snack or equally divided among the three meals.

For each of the recipes described herein, the measurements are guidelines for the preferred amount. However, those measurements may change depending on the particular needs of the horse. Upon evaluation of the dietary needs of each horse, those needs of each horse take priority over the age reference and suggested diet plan. For optimum benefit to the horse, it may be necessary to increase or decrease the suggested amounts of each plan according to the needs of each horse regardless of the exact age references in any of the recipes stated.

Preparation

Each of the ingredients is prepared separately and then mixed together. The final feed should have a texture of a moist stew. Other alternatives for preparing the product for commercial resale include freezing, dehydration, canning, and other processes. Of these, dehydration provides the preferred commercial alternative since it is more conveniently packaged, is smaller in volume, and maintains all the same nutrients levels as the fresh product.

The juiced carrots may be prepared with a commercially available juicer, such as The Juiceman, manufactured by Salton, Inc. The pulp from the carrots is separated from the juice itself and then the juice is added back to the pulp. The combination of the juice and pulp creates the total weight enumerated above in each recipe.

The corn is prepared as suggested by the manufacturer of the corn products. In an embodiment, Cascadian Farms (Rockport, Wash.) corn is used, which the manufacturer recommends that the frozen corn be prepared by steaming or by adding boiling water.

The oatmeal is typically one-minute style oatmeal although other types are available. In a one-minute oatmeal, the product is prepared as follows: Boiling water is added to oatmeal, and cooked for one minute. Such a product is available from Quaker Oats.

The soybeans as listed above are similarly prepared suggested by manufacturer. One example is the soybean product available from Westbrae Natural. The recommended preparation is as follows: for canned bean products, the beans are first rinsed; for dry product, the beans are cooked for four hours and then drained. Frozen or mashed soybeans are also possible.

The flaxseed is brown pure seed ground into a fine granular consistency. Other seeds and nuts are also possible, including almonds.

The unleavened sprouted wheat bread is available commercially such as under the product Manna Bread, which is manufactured by Nature's Path Food, Inc. of British Columbia, Canada. The ingredients for the bread include sprouted organic wheat kernels, filtered water, organic sunflower seeds, organic sesame seeds, organic flaxseeds, organic millet, poppy seeds and caraway seeds. The product is completely organic and the individual elements of the unleavened sprouted wheat bread are grown in accordance with the California Organic Food Act of 1990. As part of the recipe, the bread may be heated particularly during cold winter months and when large amounts of carrots are used in order to raise the temperature of the feed to prevent a gastro-intestinal disturbance to the animals.

The amount of water, preferably purified, is generally dependent on the degree of the moisture in the carrots. Since carrots vary by percentage of retained water, the amount of water required helps create the desired consistency and increase the fluid in-take for particular horses as needed.

In addition, other foods may be added to each of the above-described recipes. For example, beets, preferably juiced or cooked, or potatoes may be added.

These recipes can vary in ingredients depending on the needs of the particular horse. For example, for some horses, the use of corn, soybeans, or wheat bread may not be necessary to the diet. In addition, salt and canola oil may further be added to the recipes as well as garlic may be used. One type of garlic is Sea Seasonings Organic Dulse Granules with Garlic.

Feeding Schedule

The product is preferably fed to the horse three times a day according to the particular horse's schedule. If a horse has not been on a whole food, non-refined diet, the feed should be introduced gradually. It is recommended that horses start with Recipe I. Begin feeding one serving per day instead of the three servings per day. Give this amount per day for two weeks, then increase to two servings per day of the Recipe I plan. Give this amount for two weeks; then three servings per day may follow. If the horse is physically accepting the change of diet and is doing well based on the opinion of the consumer and/or veterinarian, this adjustment period could be shortened and if it is, it is done so by the discretion of the consumer and/or veterinarian.

The suggested feeding plans may be introduced in combination with the horse's present feed by dividing one serving of Recipe I and adding it to the horse's present feed. This plan may continue as the adjustment period continues. Gradual introduction of any of the recipe plans should be continued in the same manner.

It is suggested that juiced carrots may safely be increased by 2 pounds per week within the range of amounts given for each recipe plan, until the desired results are achieved for the well being of the horse.

The size and weight of a horse and the amount the horse eats will vary. A horse of less weight and less strength and activity can eat more than another horse of greater weight, strength and activity—and vice versa. This relationship between weight, size and food intake has many variables. It has been known that older horses require greater amounts of commercial feed because they do not keep their weight on easily or consistently. The subject recipes, which aid in the salivation and digestion processes and helps to promote proper assimilation of the nutrients in the digestive tract, can keep weight consistent and with less pounds of feed needed.

Studies have shown clinical evidence that when a horse begins to develop the typical aging symptoms, the blood work-ups will indicate a rise or decline away from normal levels. Also, ulcer activity throughout the digestive tract is usually present which, along with gas distention and poor gut motility, can advance a horse's health toward chronic aging and pre-mature death.

The diet described herein has been found to improve the conditions of horses suffering from life threatening health conditions such as colic, cushings, founder, cancer, arthritis, central nervous system disorder, and chronic heart disorder.

Another advantage of the present invention is that it helps re-condition teeth because it is a softer food for horses to chew, it lessens tartar build-up (thus less tooth infections) and it keeps the jaw in better working order.

Weight loss in horses is a very difficult condition to overcome. In several studies, return of normal weight through the use of the invention has been observed while commercial de-natured food products (grains, supplements, etc.) were not able to. For one particular animal, a two hundred pound weight loss return (with additional muscle weight) was observed.

The horses studied having been diagnosed with various age-related and non-age related illnesses and health problems, who were not within normal limits in their blood values did in fact return to within normal limits and also were less symptomatic muscularly, intestinally and neurologically after transition over to a whole food product. All the horses further regained a better quality of life and health.

Various changes and modifications and equivalents of the embodiments described above may be made within the scope of this invention. Thus, it is intended that all matters contained in the above description are presented by way of example only and are intended to be interpreted in as illustrative and not limited sense.

What is claimed is:

1. A method for feeding a horse with age-related or non-age related illnesses and health problems, comprising the steps of:

processing a carrot to yield carrot juice;

processing a carrot to yield carrot pulp;

combining said carrot juice and said carrot pulp into a mixture prior to consumption; and feeding said mixture to said horse, wherein the illness and health problem is selected from the group consisting of chewing problems, tooth infections, ulcers, colic, Cushing's, founder, cancer, arthritis, central nervous system disorder, chronic heart disorder and weight loss.

2. The method of claim 1, wherein said steps for processing may occur simultaneously or in either order.

3. The method of claim 1, wherein said steps for processing and combining may occur simultaneously.

4. The method of claim 1, wherein substantially all of said carrot juice and substantially all of said carrot pulp are derived from at least the same carrot.

5. The method of claim 1, wherein the volumetric ratio of carrot pulp to carrot juice is roughly 3:1.

6. The method of claim 1, wherein said methods of processing are juicing.

7. The method of claim 1, further including the step of dehydrating the mixture.

8. The method of claim 1, further including the step of adding flaxseed to said mixture.

9. The method of claim 1, further including the step of adding almonds to said mixture.

10. The method of claim 1, further including the step of adding wheat bread to said mixture.

11. The method of claim 1, further including the step of adding corn to said mixture.

12. The method of claim 1, further including the step of adding soybeans to said mixture.

13. The method of claim 1, further including the step of adding cooked oatmeal to said mixture.

* * * * *